(12) United States Patent
Ku et al.

(10) Patent No.: US 11,238,773 B2
(45) Date of Patent: Feb. 1, 2022

(54) ELECTRONIC DEVICE, METHOD FOR CONTROLLING ELECTRONIC DEVICE, AND COMPUTER READABLE MEDIUM

(71) Applicant: SAMSUNG ELECTRONICS CO., LTD., Suwon-si (KR)

(72) Inventors: Jungmin Ku, Suwon-si (KR); Sunghwan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/960,155

(22) PCT Filed: Jan. 4, 2019

(86) PCT No.: PCT/KR2019/000140
§ 371 (c)(1),
(2) Date: Jul. 6, 2020

(87) PCT Pub. No.: WO2019/160242
PCT Pub. Date: Aug. 22, 2019

(65) Prior Publication Data
US 2021/0056883 A1    Feb. 25, 2021

(30) Foreign Application Priority Data

Feb. 19, 2018    (KR) .......................... 10-2018-0019318

(51) Int. Cl.
*G09G 3/20*       (2006.01)
*G09G 5/10*       (2006.01)
(Continued)

(52) U.S. Cl.
CPC ............ *G09G 3/2003* (2013.01); *G09G 5/10* (2013.01); *H04N 5/66* (2013.01);
(Continued)

(58) Field of Classification Search
CPC combination set(s) only.
See application file for complete search history.

(56) References Cited

U.S. PATENT DOCUMENTS 8,390,640 B2    3/2013    Aoki et al.
9,424,804 B2    8/2016    Jung et al.
(Continued)

FOREIGN PATENT DOCUMENTS

JP    2006-285063    10/2006
JP    2011-48196     3/2011
(Continued)

OTHER PUBLICATIONS

International Search Report for PCT/KR2019/000140 dated Apr. 5, 2019, 5 pages with English Translation.
(Continued)

*Primary Examiner* — Wesner Sajous
(74) *Attorney, Agent, or Firm* — Nixon & Vanderhye, P.C.

(57) ABSTRACT

An electronic device is disclosed. The electronic device comprises a sensor, and a processor for acquiring the surrounding illuminance of the electronic device through the sensor, confirming a gain value for adjusting the gradation value of an image on the basis of the surrounding illuminance of the electronic device, and adjusting the gradation value of the image on the basis of the gain value, wherein the gain value is a value determined on the basis of visual sensitivity characteristics of a user.

13 Claims, 10 Drawing Sheets

(51) Int. Cl.
*H04N 5/66* (2006.01)
*H04N 1/60* (2006.01)
*H04N 9/77* (2006.01)

(52) U.S. Cl.
CPC ............... *G09G 2320/0626* (2013.01); *G09G 2320/0666* (2013.01); *G09G 2360/14* (2013.01)

(56) References Cited

U.S. PATENT DOCUMENTS

| | | | |
|---|---|---|---|
| 2002/0051086 A1 | 5/2002 | Su | |
| 2008/0204438 A1* | 8/2008 | Song | G09G 3/3225 345/207 |
| 2009/0267973 A1* | 10/2009 | Lee | G09G 3/3225 345/690 |
| 2011/0175925 A1 | 7/2011 | Kane et al. | |
| 2015/0070337 A1* | 3/2015 | Bell | G09G 3/007 345/207 |
| 2016/0284261 A1 | 9/2016 | Choi et al. | |
| 2016/0293139 A1* | 10/2016 | Kwon | G06F 3/0482 |
| 2016/0314762 A1* | 10/2016 | Lee | G09G 3/20 |
| 2017/0047048 A1 | 2/2017 | Rumreich et al. | |
| 2020/0336657 A1* | 10/2020 | Kim | H04N 5/23229 |

FOREIGN PATENT DOCUMENTS

| | | |
|---|---|---|
| JP | 2011-203342 | 10/2011 |
| JP | 5134508 | 1/2013 |
| JP | 2013-186369 | 9/2013 |
| JP | 2017-521691 | 8/2017 |
| KR | 10-2013-0098654 | 9/2013 |
| KR | 10-1356516 | 1/2014 |
| KR | 10-2014-0042578 | 4/2014 |
| KR | 10-2015-0057039 | 5/2015 |
| KR | 10-2016-0002244 | 1/2016 |

OTHER PUBLICATIONS

Written Opinion of the ISA for PCT/KR2019/000140 dated Apr. 5, 2019, 9 pages with English Translation.
Extended Search Report dated Feb. 8, 2021 in counterpart European Patent Application No. 19754148.5.

* cited by examiner

FIG. 1A
FIG. 1B
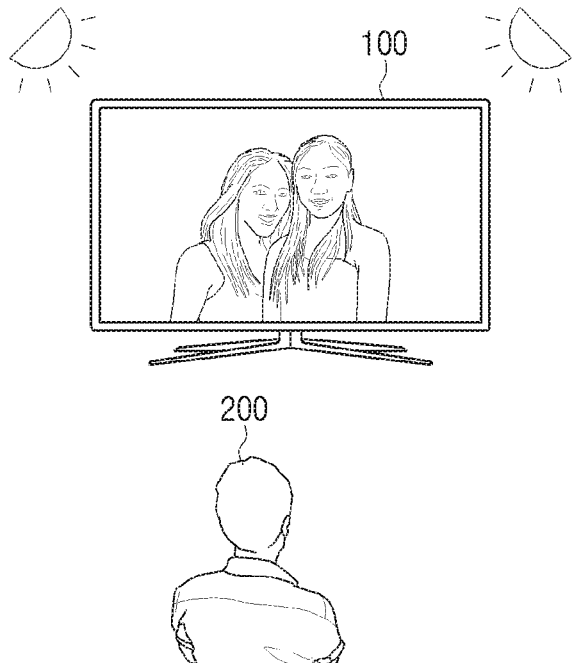
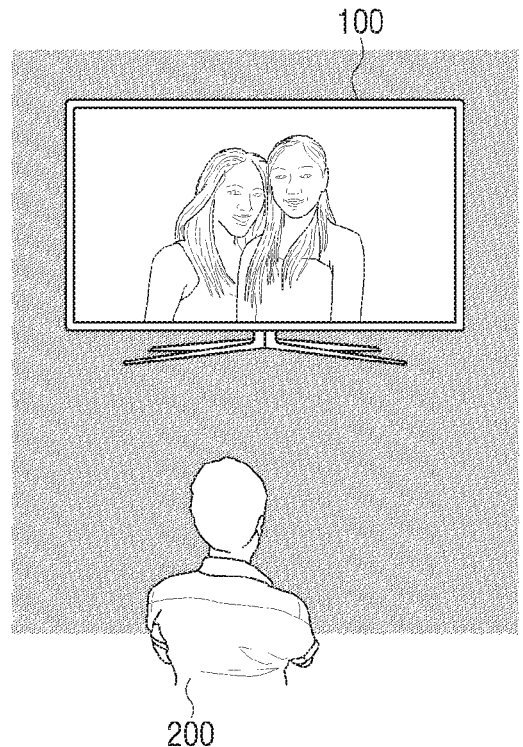

ELECTRONIC DEVICE, METHOD FOR CONTROLLING ELECTRONIC DEVICE, AND COMPUTER READABLE MEDIUM

This application is the U.S. national phase of International Application No. PCT/KR2019/000140 filed Jan. 4, 2019 which designated the U.S. and claims priority to KR Patent Application No. 10-2018-0019318 filed Feb. 19, 2018, the entire contents of each of which are hereby incorporated by reference.

TECHNICAL FIELD

This disclosure relates to an electronic device and, more particularly, to a technology to control color temperature of an image according to color sense recognition character of a human corresponding to a surrounding illuminance.

BACKGROUND ART

In displaying an image on a display of an electronic device or a display of an external device connected to an electronic device, related-art electronic devices control color temperature of an image displayed on a display to be constant regardless of surrounding brightness.

Even if an illuminance sensor is provided, the related-art electronic device changes the brightness of an image displayed on the display based on the surrounding brightness acquired through the illuminance sensor.

Among the related-art electronic devices, there is an electronic device for controlling the color temperature of an image displayed on the display based on the color temperature of the surrounding environment measured through a color sensor, but the color sensor is relatively expensive compared to the illuminance sensor, and thus there are not many electronic devices that use the color sensor to control the color temperature of the image displayed on the display.

SUMMARY

An object of the disclosure is to provide an electronic device which adjusts a gradation value of an image based on the measured surrounding illuminance and a visual sensitivity characteristic of a user and displays, on a display, an image of which the gradation value is adjusted.

According to an embodiment, an electronic device according to an embodiment includes a sensor and a processor configured to acquire a surrounding illuminance of the electronic device through the sensor, confirm a gain value for adjusting a gradation value of an image based on the surrounding illuminance of the electronic device, and adjust the gradation value of the image based on the gain value, and the gain value is a value determined based on a visual sensitivity characteristic of a user.

The processor may, based on the surrounding illuminance being darker than a predetermined brightness, adjust the gradation value of the image based on a gain value determined based on the visual sensitivity characteristic of the user and the surrounding illuminance.

The processor may, based on the surrounding illuminance being darker than a predetermined brightness, among red (R), green (G), and blue (B), decrease a gradation value of B, having a high visual sensitivity of the user, or increase a gradation value of R, having a low visual sensitivity of the user, in a scotopic vision based on the gain value.

The gain value may include an R gain value for adjusting a gradation value of R and a B gain value for adjusting a gradation value of B, the R gain value for adjusting the gradation value of R may get higher based on the surrounding illuminance being darker, with respect to a reference value corresponding to the predetermined brightness, and the B gain value for adjusting the gradation value of B may get lower based on the surrounding illuminance being darker, with respect to a reference value corresponding to the predetermined brightness.

A degree to which the R gain value and the B gain value change according to the surrounding illuminance may be determined based on a target change amount with respect to a color temperature of the image.

The processor may, based on the surrounding illuminance getting darker than the predetermined brightness in a state where the surrounding illuminance is brighter than the predetermined brightness, adjust the gradation value of the image based on the determined gain value.

The processor may confirm a target gradation value for the image based on the gain value, and adjust the gradation value of the image by changing the gradation value of the image to the target gradation value.

The processor may, based on the surrounding illuminance being darker than a predetermined brightness, adjust the gradation value of the image so that the gradation value of the image becomes the target gradation value within a first time, and adjust the gradation value of the image so that the gradation value of the image becomes the target gradation value within a second time that is shorter than the first time.

A method for controlling an electronic device includes acquiring a surrounding illuminance of the electronic device through a sensor, confirming a gain value for adjusting a gradation value of an image based on the acquired surrounding illuminance, and adjusting the gradation value of the image based on the gain value, and the gain value may be a value determined based on a visual sensitivity characteristic of a user.

The adjusting may include, based on the surrounding illuminance being darker than a predetermined brightness, adjusting a gradation value of the image based on a gain value determined based on the visual sensitivity characteristic of the user and the surrounding illuminance The adjusting may include, based on the surrounding illuminance being darker than a predetermined brightness, among red (R), green (G), and blue (B), decreasing a gradation value of B, having a high visual sensitivity of the user, or increasing a gradation value of R, having a low visual sensitivity of the user, in a scotopic vision based on the gain value.

The gain value may include an R gain value for adjusting a gradation value of R and a B gain value for adjusting a gradation value of B, the R gain value for adjusting the gradation value of R gets higher based on the surrounding illuminance being darker, with respect to a reference value corresponding to the predetermined brightness, and the B gain value for adjusting the gradation value of B may get lower based on the surrounding illuminance being darker, with respect to a reference value corresponding to the predetermined brightness.

A degree to which the R gain value and the B gain value change according to the surrounding illuminance may be determined based on a target change amount with respect to a color temperature of the image.

The adjusting may include, based on the surrounding illuminance getting darker than the predetermined brightness in a state where the surrounding illuminance is brighter than the predetermined brightness, adjusting the gradation value of the image based on the determined gain value.

The adjusting may include confirming a target gradation value for the image based on the gain value, and adjusting the gradation value of the image by changing the gradation value of the image to the target gradation value.

The adjusting may include, based on the surrounding illuminance being darker than a predetermined brightness, adjusting the gradation value of the image so that the gradation value of the image becomes the target gradation value within a first time, and based on the surrounding illuminance being brighter than a predetermined brightness, adjusting the gradation value of the image so that the gradation value of the image becomes the target gradation value within a second time that is shorter than the first time.

According to an embodiment, a computer readable medium stores therein a computer instruction which is executed by a processor of an electronic device to perform the method including acquiring a surrounding illuminance of the electronic device through a sensor, confirming a gain value for adjusting a gradation value of an image based on the acquired surrounding illuminance, and adjusting the gradation value of the image based on the gain value, and the gain value may be a value determined based on a visual sensitivity characteristic of a user.

BRIEF DESCRIPTION OF THE DRAWINGS

FIGS. 1A and 1B are diagrams illustrating an electronic device according to an embodiment;

DETAILED DESCRIPTION OF EXAMPLE EMBODIMENTS

Figure 2:
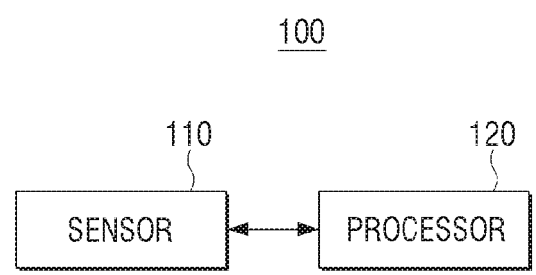
FIG. 2 is a block diagram illustrating a configuration of an electronic device according to an embodiment.

The embodiments may apply various transformations and may have various embodiments, which are illustrated in the drawings and are described in detail in the detailed description. It is to be understood, however, that the intention is not to limit the scope of the particular embodiments, but on the contrary, the intention is to cover all modifications, equivalents, and alternatives falling within the spirit and scope of the disclosure. A detailed description of conventional techniques related to the disclosure that may unnecessarily obscure the gist of the disclosure will be omitted.

The terminology used in this application is for the purpose of describing particular embodiments only and is not intended to limit the scope of the claims. A singular expression includes a plural expression, unless otherwise specified. It is to be understood that the terms such as "comprise" or "consist of" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Hereinafter, the embodiment will be described in greater detail with reference to the drawings.

FIGS. 1A and 1B are diagrams illustrating an electronic device according to an embodiment.

FIGS. 1A and 1B illustrate an electronic device 100 and a user 200 watching an image through a display of the electronic device 100.

FIG. 1A illustrates an example that the surrounding environment of the electronic device 100 is bright, and FIG. 1B illustrates that the surrounding environment of the electronic device 100 is dark.

In the electronic device 100 of FIGS. 1A and 1B according to an embodiment, in each case where the surrounding environment is bright as shown in FIG. 1A and the surrounding environment is dark as shown in FIG. 1B, even if the same image is displayed, a gradation value of the displayed image may be different in both cases.

If the electronic device 100 controls the color temperature of the image through the same gradation value regardless of whether the surrounding environment is bright or dark, the visual sensitivity characteristics is considered such that the visual sensitivity which the user 200 may feel is changed according to the surrounding brightness even if the same image is displayed.

Accordingly, embodiments of the electronic device 100 have an effect of continuously providing an image of the same color sense to a user despite changes in the surrounding brightness.

Although FIGS. 1A and 1B illustrate an embodiment in which the electronic device 100 directly includes a display to adjust a gradation value of an image according to a surrounding illuminance, unlike FIG. 1, an electronic device (not shown), which does not include a display, may adjust a gradation value of a particular image, and then control so that an image of which gradation value is adjusted is displayed on an external device (not shown).

FIG. 2 is a block diagram illustrating a configuration of the electronic device 100 according to an embodiment.

The electronic device 100 may be implemented as a television (TV) including a display, a monitor, a smartphone, a smart watch, a tablet personal computer (PC), a desktop PC, a notebook, or the like.

The electronic device 100 may be connected to an external device (not shown) which is implemented as a set-top box, a server, or the like, and includes a display.

Referring to FIG. 2, the electronic device 100 may include a sensor 110 and a processor 120.

The sensor 110 may be implemented as an illuminance sensor to measure surrounding illuminance, that is, surrounding brightness of the electronic device 100.

The sensor 110 may include a light variable resistor of which a resistance value varies according to the measured light intensity. The sensor 110 may include a photodiode that receives light energy around the electronic device 100 and converts the light energy into electrical energy.

The processor 120 may control an overall operation of the electronic device 100. The processor 120 may adjust a gradation value of an image based on a surrounding illuminance value measured through the sensor 110.

In this example, the gradation value of the image includes an output amount for each of the light of a single wavelength which each of the pixels included in a display (not shown) outputting the image may output. The display may be included in the electronic device 100, or may be a display of an external device (not shown) that displays an image under the control of the electronic device 100.

As an example, the display may use lights of a single wavelength of red, green, and blue to display an image, in which example, the electronic device 100 may adjust the gradation value of the image displayed on the display by controlling the output amount of light of three single wavelengths, respectively.

Figure 3A:
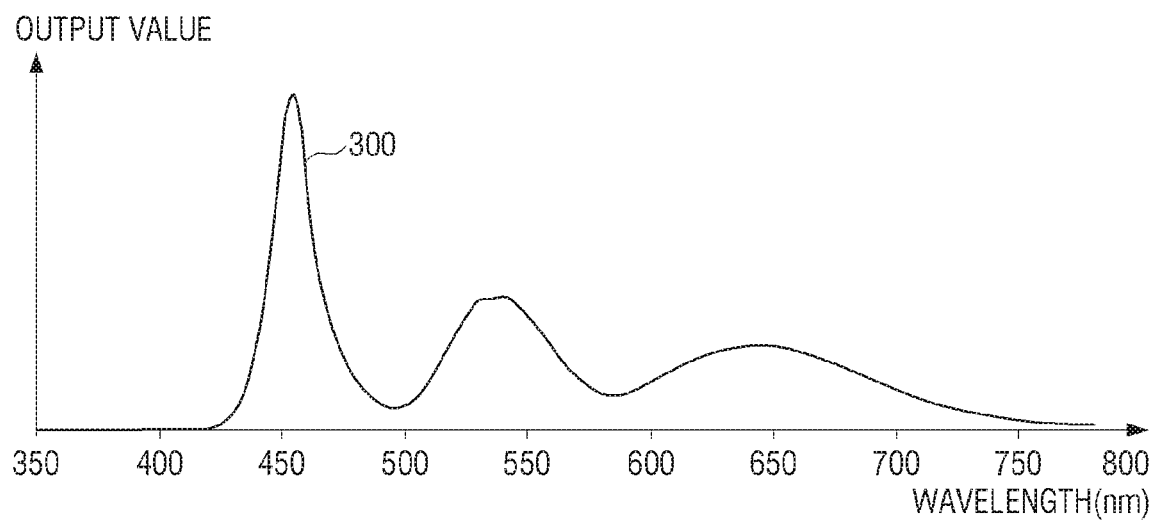
FIGS. 3A, 3B, 4A, 4B, 4C, and 5 are graphs illustrating various embodiments and a principle supporting the embodiments according to an embodiment.
Figure 3B:
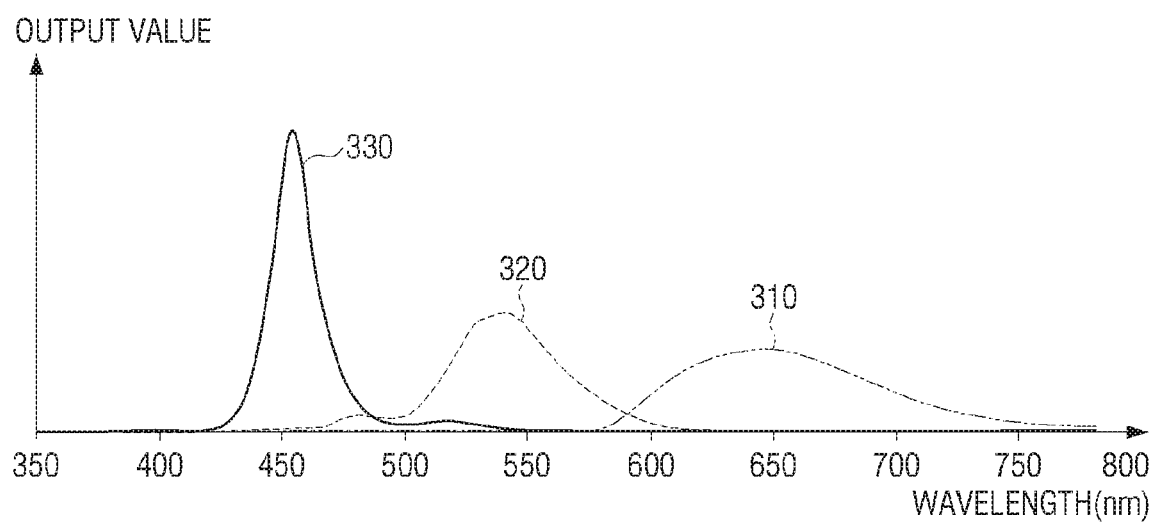

FIGS. 3A and 3B illustrate an embodiment of using lights of three single wavelengths of red, green, and blue so that the electronic device 100 configures color sense of an image.

FIG. 3A is a graph illustrating that the electronic device 100 adjusts a gradation value of an image, and is an example where the electronic device 100 adjusts the gradation value of the image such that light of each wavelength corresponding to the visible light (light having a wavelength of about 400 nm to 700 nm) is output, intensity 300 of light output by wavelengths is relatively represented.

FIG. 3B illustrates the intensity of light of three single wavelengths for each wavelength to be represented, to represent light of all the wavelength corresponding to a visible light using lights of single wavelength of red, green, and blue.

In this example, if three wavelengths corresponding to intensity of light of the red wavelength 310 for each wavelength, intensity of light of the green wavelength 320 output for each wavelength, intensity of the blue wavelength 330 of light output for each wavelength are combined, an output waveform as shown in FIG. 3A may be acquired.

FIG. 3B is deeply related to a standard observer of the Commission Internationale de L'éclairage (CIE) where the eye recognizes light of various wavelengths according to a change in a tristimulus value.

In one embodiment, the processor 120 may acquire the surrounding illuminance of the electronic device 100 via the sensor 110, identify a gain value for adjusting the gradation value of the image based on the surrounding illuminance of the electronic device 100, and adjust the gradation value of the image based on the identified gain value.

The gain value may mean a ratio of intensity of each of the light of a single wavelength outputtable through a display (not shown) of an external device (not shown) or the electronic device 100.

In an example where each gradation value of red (R), green (G), and blue (B) of a single wavelength by colors (corresponding to horizontal wavelengths of FIG. 3B) of an output image is as illustrated in FIG. 3B, it may be defined that each gain value is 1. Referring to FIG. 3B, when a color corresponding to a wavelength of 450 nm is displayed through a display (not shown) of the electronic device 100 or an external device (not shown), even if the intensity of B is absolutely the strongest among R, G, and B, the gain values of each of R, G, and B may be "1" in the same manner Based on the above, the processor 120 may vary the gain values of R, G, and B according to the surrounding illuminance of the electronic device 100, and may adjust the gradation value of the image (intensity of each R, G, and B) differently from FIG. 3B based on the different gain value.

Even if the color of the image to be displayed is the same, the processor 120 may change an output amount of each R, G, and B by adjusting gain values of each R, G, and B according to the surrounding illuminance.

The gain value may be determined based on the visual sensitivity characteristic of a user.

Figure 4A:
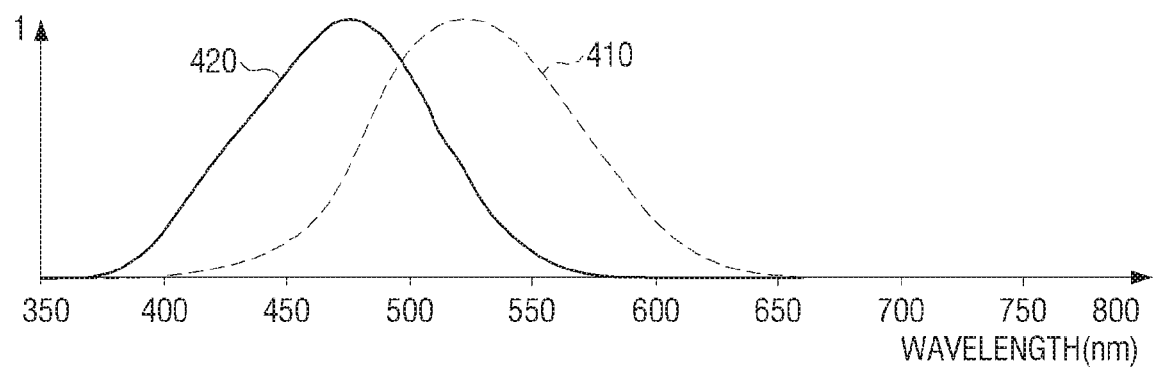
Figure 4B:
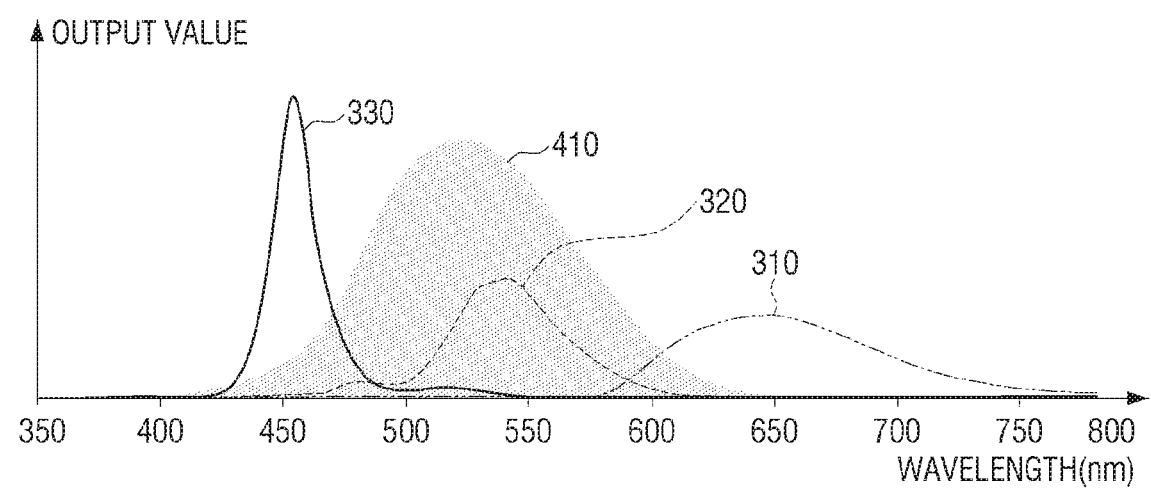
Figure 4C:
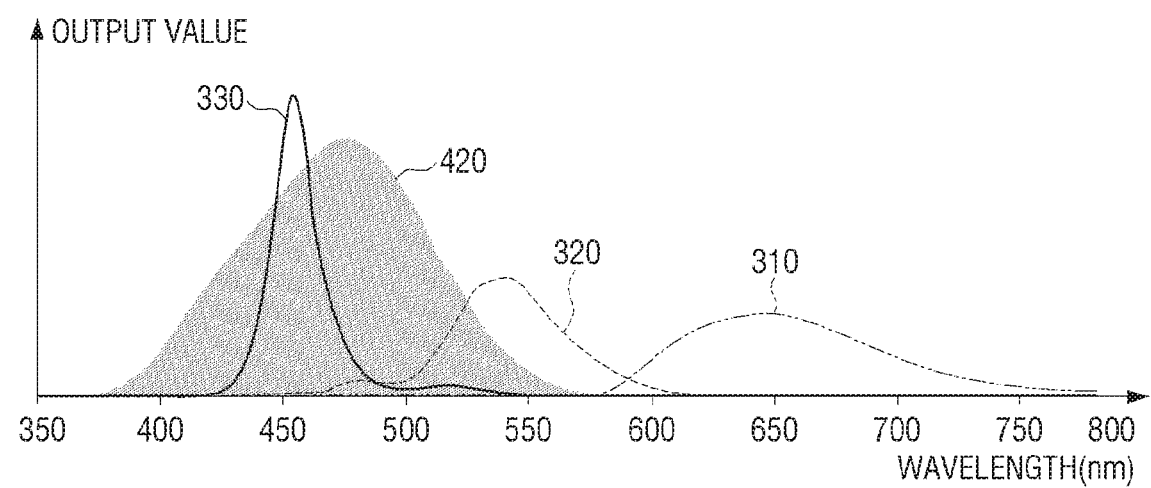

FIGS. 4A, 4B, and 4C are graphs illustrating a visual sensitivity characteristic according to surrounding brightness.

FIG. 4A illustrates the relative visual sensitivity curves 400 of the CIE for two brightness. The visual sensitivity refers to a degree to which the human's eye may perceive for light of each wavelength, and the visual sensitivity curve refers to a curve representing the visual sensitivity by wavelengths with respect to a certain range of wavelengths.

The visual sensitivity refers to a degree of recognizing by the human's eye and thus, the certain range above refers to a wavelength range of a visible ray.

The relative visual sensitivity curve represents the visual sensitivity value for light of each wavelength by setting the visual sensitivity value for light of the wavelength having the highest visibility to 1.

FIG. 4A illustrates a relative visual sensitivity curve 410 when the surrounding brightness is photopic vision (relatively bright) and a relative visual sensitivity curve 420 when the surrounding brightness is scotopic vision (relatively dark). It can be seen that when the surrounding brightness is higher (photopic vision), light of a relatively high wavelength is better recognized than when the surrounding brightness is dark (scotopic vision).

Referring to FIG. 4A, the visual sensitivity for about 555 nm wavelength is the highest in a photopic vision (day time), and the visual sensitivity for about 507 nm is the highest in a scotopic vision (nighttime).

However, the criteria for distinguishing between photopic vision and scotopic vision are various in the related art, and it may be difficult to quantitatively acquire a perfect relative visual sensitivity value through the criteria of day and night.

For example, if the surrounding brightness is greater than 10 lux, then it may be set to the photopic vision, and if the surrounding brightness is less than 10 lux, it may be set to the scotopic vision, and if the surrounding brightness is greater than or equal to 100 nit, then it may be set to be the photopic vision, and if the brightness is less than or equal to one nit, it may be set to the scotopic vision.

The scotopic vision and photopic vision may be distinguished on a 12 lux basis, or 12 lux may be set to be photopic vision, 0 lux is the scotopic vision, and the value between 0 and 12 lux may be set to photopic vision. However, the examples are not limited to the examples.

FIGS. 4B and FIG. 4C are graphs respectively overlapping the photopic vision relative visual sensitivity curve 410 and the scotopic vision relative visual sensitivity curve 420 are with the graph of FIG. 3B, in a state where the wavelength (nm) of the horizontal axis is matched.

In the photopic vision, the visual sensitivity for light of red and green wavelengths is higher than the scotopic vision, and in the scotopic vision, the visual sensitivity for light of blue wavelength is higher than the photopic vision.

Figure 5:
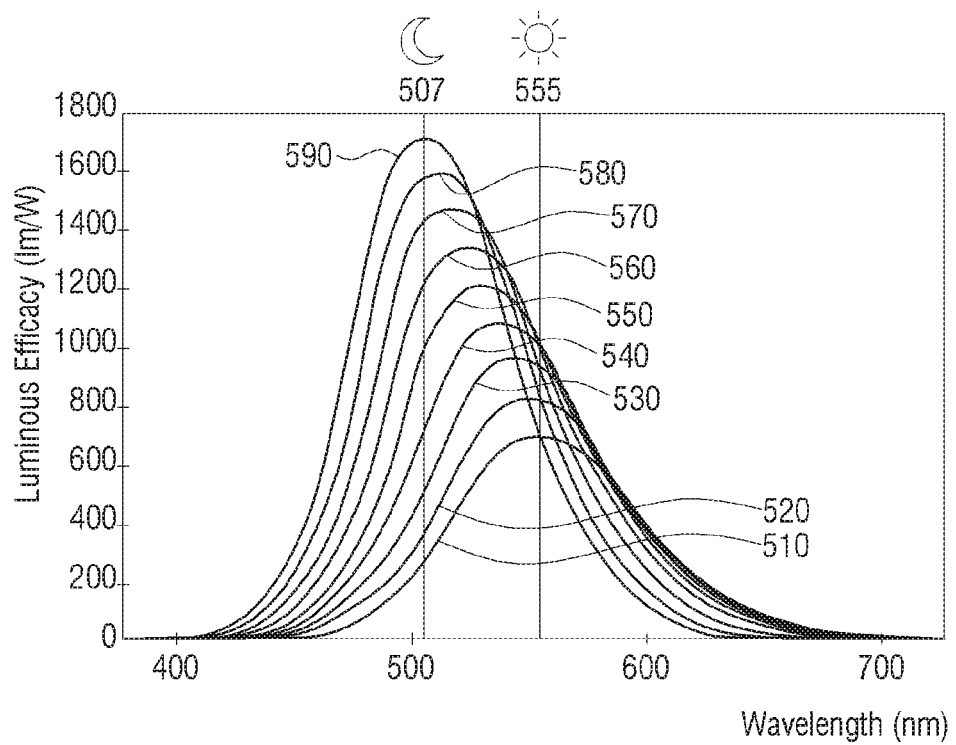

FIG. 5 is a schematic graph illustrating visual sensitivity by wavelengths in photopic vision, scotopic vision, and an intermediate brightness (: mesopic vision) of the photopic vision and the scotopic vision.

Referring to FIG. 5, a first graph 510 having the highest wavelength and including the maximum visual sensitivity among the nine curves corresponds to the relative visual sensitivity curve 410 of FIG. 4A in the photopic vision, and a ninth graph 590 having the lowest wavelength and including the maximum visual sensitivity among the nine curves corresponds to the relative visual sensitivity 420 of FIG. 4A.

It is the case that the brightness gradually decreases gradually from the first graph 510 to the ninth graph 590, and the lower the brightness, and the visual sensitivity characteristic may be identified that the higher the visual sensitivity for light of a lower wavelength.

Even if the gradation value of the image displayed through the display (not shown) of the electronic device 100 or the external device (not shown) is maintain the same by the processor 120, it may be seen that the color temperature or color sense of the image felt by the user 200 may be changed according to the brightness. In one example, even the same image will appear to look more blue when the surrounding is dark, than the case when the surrounding is bright.

After the processor 120 recognizes that the surrounding brightness of the electronic device 100 has changed through the sensor 110, the processor 120 may increase the intensity of the light having a wavelength of which visual sensitivity becomes weaker due to change in brightness and decrease the intensity of the light having a stronger visual sensitivity due to the change of brightness.

As a result, the electronic device 100 may provide the user 200 with an image having the same color sense when the surrounding brightness changes.

The processor 120 according to an embodiment may adjust a gradation value of an image based on a gain value determined according to the visual sensitivity characteristic and a surrounding illuminance when the surrounding illuminance is darker than a preset brightness.

If the gain value refers to a gain value for each R, G, and B, in general, since scotopic vision has a high visual sensitivity for B and low visual sensitivity for R than photopic vision, a gain value of B in scotopic vision may be determined to be low and/or a gain value of R may be determined to be high.

The R gain value gradually increases as the surrounding illuminance becomes darker based on a reference value corresponding to the preset brightness, while the B gain value becomes smaller as the surrounding illuminance becomes darker based on the reference value corresponding to the preset brightness.

The gain values of each R, G, and B may be represented as a gain value graph for each R, G, and B with respect to the surrounding illuminance.

In this example, the graph may be provided by setting all the gain values of each R, G, and B by surrounding illuminances based on the visual sensitivity as FIGS. 4 and 5, and may be a graph of a linear function, a quadratic function or higher.

In this example, the gain values for the surrounding illuminance of each R, G, and B shown in the graph may be the gain values of each R, G, and B, which should be reflected in the gradation value adjustment of R, G, and B for each of the surrounding illuminance values.

If the graph representing the gain values of the R, G, and B values is in the form of a graph of the linear function, the degree to which the R, G, and B gain values are changed according to the surrounding illuminance may be determined based on the target change amount with respect to the color temperature of the image.

The target change amount with respect to the color temperature of the image may be set based on a visual sensitivity characteristic corresponding to the surrounding illuminance of the electronic device 100, or may be arbitrarily set, and the color temperature of the image may be changed by the target change amount by particularly changing the gain value of R and B, among R, G, and B.

Figure 6:
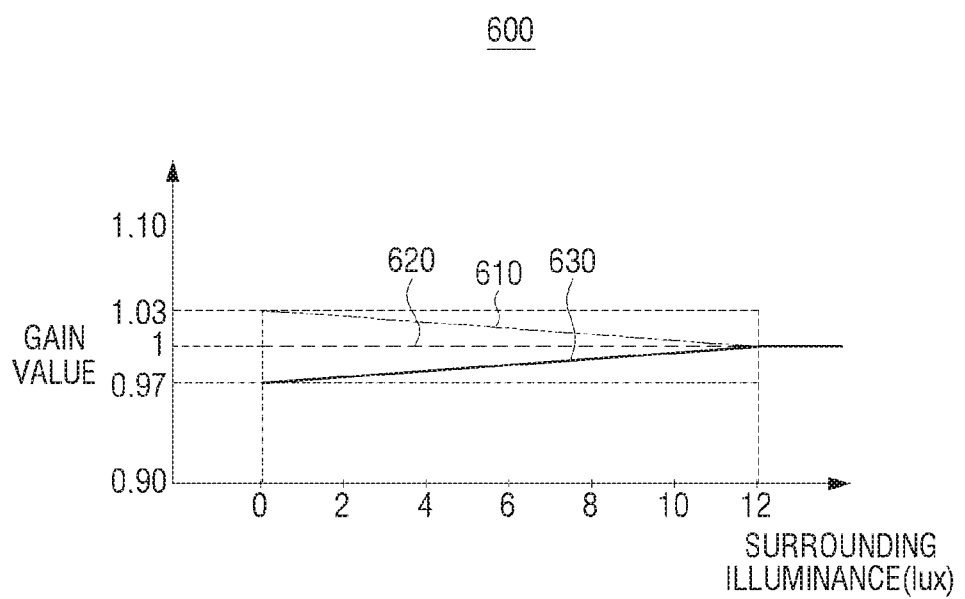
FIGS. 6 and 7 are graphs illustrating adjustment of a gradation value of an image according to an embodiment.

For example, FIG. 6 illustrates the gain values of each R, G, and B as a linear graph form.

FIG. 6 illustrates that a case where the surrounding illuminance is 12 lux or higher is defined as the photopic vision, and considering that the surrounding illuminance decreases from 12 lux to 0 lux and the visual sensitivity characteristic of the user 200 is changed as compared to the photopic vision, if the surrounding illuminance is between 12 lux and 0 lux, the determined gain values of R, G, and B are illustrated. In this example, when the surrounding illuminance is 12 lux or higher, the target gain values of R, G, and B may be set to "1" as illustrated in FIG. 6.

If the surrounding illuminance is changed from 12 lux to 0 lux, then the visual sensitivity for B is increased and the visual sensitivity for R is reduced, so that the processor 120 needs to reduce the color temperature of the displayed image. In order for the processor 120 to reduce the color temperature of the image, the gain value of R may increase and the gain value of B may decrease.

As an example, in FIG. 6, the color temperature of the image displayed on the display 130 is reduced by approximately 500K (Kelvin) as the surrounding illuminance changes from 12 lux to 0 lux. That is, in the case of FIG. 6, the target change amount is 500 K.

The target change amount is not limited to 500K, but may be variously set based on the criteria for determining the photopic vision and the scotopic vision and the attributes of a display (not shown) on which the image is displayed.

Accordingly, if the surrounding illuminance is 0 lux, the gain value of B is determined to be 0.97, and the gain value of R is determined to be 1.03, so that the color temperature of the image may be reduced by approximately 500 K when the surrounding illuminance is 12 lux. As a result, the color sense difference of the image felt by the user 200 may be reduced in accordance with the surrounding illuminance difference (12 lux→0 lux).

Referring to FIG. 6, a linear graph (straight line) connecting a gain value when the surrounding illuminance is 12 lux and a gain value when the surrounding illuminance is 0 lux for each R, G, and B may be acquired.

Gain values 610, 620, and 630 of each R, G, B in a case where the surrounding illuminance is 0 lux to 12 lux may be determined.

The processor 120 may adjust the gradation value of the image based on the determined gain value when the surrounding illuminance gets darker than the predetermined brightness in a state where the surrounding illuminance is brighter than the predetermined brightness.

Specifically, the processor 120 may identify a target gradation value for an image based on the gain value, and adjust the gradation value of the image by changing the gradation value of the image to a target gradation value.

For example, the processor 120 may set the gain values of each R, G, and B to be "1" in a state where the surrounding illuminance is 15 lux which is greater than or equal to 12 lux, and if the surrounding illuminance changes to 6 lux while the surrounding of the electronic device 100 gets dark, the processor 120 may change the gain values of R and B to the target gain values of "1.015" and "0.985" (see FIG. 6).

The processor 120 may adjust the gradation value of the image based on the changed gain values of the R and B.

The processor 120 may adjust the gradation value of the image such that the gradation value of the image is the target gradation value within a predetermined first time when the surrounding illuminance is darker than the predetermined brightness.

This takes into account the time it takes for the human eye to adapt to darkness, specifically, when the surrounding illuminance is brighter than the preset brightness and then darkens, the processor 120 may adjust the gradation value of the image so that the gradation value of the image within the first time becomes the target gradation value.

In the case of FIG. 6, for example, if the surrounding illuminance is 15 lux and then is darkened to 0 lux, the processor 120 may confirm that the target gain value of R and B is "1.03" and "0.97", and adjust the gradation value of the image with the gradation value corresponding to the R gain value "1.03" and the B gain value "0.97."

When changing the gradation value of the image from the gradation value corresponding to the gain value (all the gain values of R, G, and B are "1") when the surrounding illuminance is 15 lux to the gradation value corresponding to the target gain value when the surrounding illuminance is 0 lux, the processor 120 may change the gradation value over a predetermined first time, instead of changing the gradation value for a moment.

In this example, the first time may be, but is not limited to, 45 minutes, preferably.

The processor 120, when changing the gradation value of the image during the first time, may sequentially change the gradation value of the image by image frames.

Figure 7:
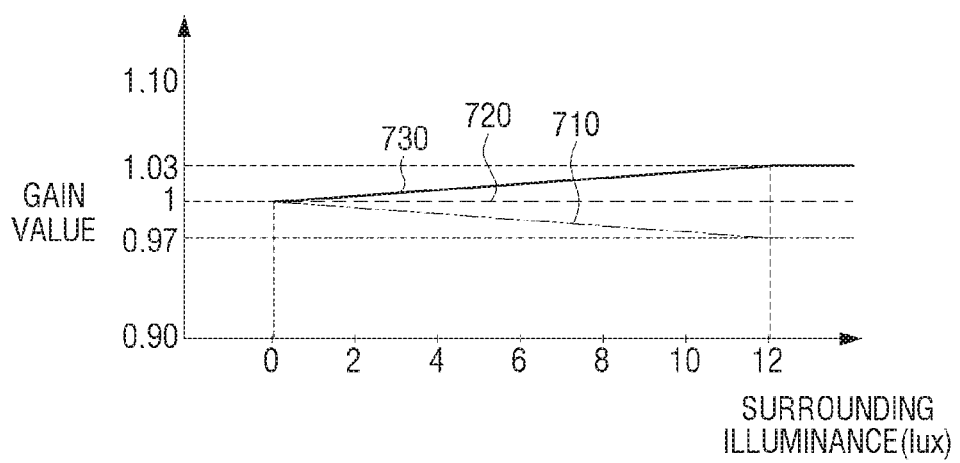

FIG. 7 is a still another embodiment illustrating gain values of each R, G, and B according to the surrounding brightness in a linear graph format.

FIG. 7 also illustrates the gain values of R, G, and B determined when the surrounding illuminance is between 0 lux and 12 lux, when the case where the surrounding illuminance is greater than or equal to 12 lux as the photopic vision as illustrated in FIG. 6, and considering that the visual sensitivity characteristic of the user 200 changes while the surrounding illuminance increases from 0 lux to 12 lux.

Unlike FIG. 6, when the surrounding illuminance is 0 lux, the target gain values of R, G, and B may be set to "1".

If the surrounding illuminance is changed from 0 lux to 12 lux, the visual sensitivity for R may increase and the visual sensitivity for B may decrease, and the processor 120 needs to increase the color temperature of the displayed image. In order for the processor 120 to increase the color temperature of the image, the processor 120 may decrease the gain value of R, and increase the gain value of B.

As an example, in FIG. 7, the color temperature of the image displayed on the display 130 is approximately 500K (Kelvin) as the surrounding illuminance changes from 0 lux to 12 lux. That is, the target change amount is 500 K.

If the surrounding illuminance is 12 lux, the gain value of R is determined to be 0.97, and the gain value of B is determined to be 1.03, so that the color temperature of the image may be increased by approximately 500 K, which is the target change amount, as compared to the case when the surrounding illuminance is 0 lux. As a result, the difference in the color sense which the user 200 may feel according to the difference of the surrounding illuminance (0 lux→12 lux) may decrease.

Referring to FIG. 7, the linear graph (straight line) connecting the gain value when the surrounding illuminance is 0 lux and the surrounding illuminance is 12 lux for each R, G, B may be acquired.

Through this, all the gain values 710, 720, 730 of each R, G, B in a case where the surrounding illuminance is 0 lux to 12 lux may be determined.

If the surrounding illuminance is brighter than a predetermined brightness, the processor 120 may adjust the gradation value of the image so that the gradation value becomes the target gradation value within a second time which is shorter than the first time.

This considers time taken for the human eye to be adapted to brightness, and the reason why the second time is shorter than the first time is that the time taken for adaptation to brightness is shorter than the time taken for adaptation to darkness.

When the surrounding illuminance has been darker than a preset brightness and then gets brighter, the processor 120 may adjust the gradation value of the image so that the gradation value of the image in the second time becomes the target gradation value.

In the case of FIG. 7, for example, if the surrounding illuminance was 0 lux and then becomes brighter to 15 lux, the processor 120 may check that the target gain values of R and B are "0.97" and "1.03," and adjust the gradation value of the image as the gradation value corresponding to the R gain value "0.97" and the B gain value "1.03."

In this example, in changing the gradation value corresponding to the gain value (all the gain values of R, G, B is "1") when the surrounding illuminance is 0 lux to the gradation value corresponding to the target gain value when the surrounding illuminance is 15 lux, the processor 120 may change the gradation value over the preset second time, instead of changing the gradation value at a moment.

The second time may be, preferably, one minute, but is not limited thereto.

The processor 120 may sequentially change the gradation value of the image by image frames in changing the gradation value of the image over the second time.

The processor 120 may adjust the gradation value of the image based on a gain value determined according to the visual sensitivity characteristic of the user and the surrounding illuminance, if the surrounding illuminance is darker than the predetermined brightness and the brightness of the image displayed on the display (not shown) of the electronic device 100 or the external device (not shown) is darker than another predetermined brightness. That is, the brightness of the display (not shown) itself may be included in a reference to which the gain values of R, G, and B are determined.

This is because, even if the surrounding environment of the electronic device 100 is the scotopic vision, when an image which should be displayed on a display (not shown) is very bright, it is not possible to determine the gradation value of the image based on the visual sensitivity characteristic considering only the surrounding illuminance.

For example, the predetermined another brightness associated with the brightness of an image displayed on a display (not shown) may be 120 nit based on 100 Institute of Radio Engineers (IRE) ("100 IRE" indicates that a color of an image is white). However, this may be changed by the user.

The scotopic vision may be set to a case where the surrounding illuminance is less than or equal to 12 lux and the brightness of the image displayed on the display (not shown) is less than or equal to 120 nit based on 100 IRE, and the photopic vision can be set in all cases, except the scotopic vision.

If the surrounding illuminance is less than or equal to a predetermined brightness and the brightness of the image displayed on the display (not shown) is less than or equal to another predetermined brightness, the processor 120 may adjust the gradation value of the image by predicting the visual sensitivity characteristic based on the brightness of the image displayed on the display (not shown) rather than the surrounding illuminance.

Figure 8A:
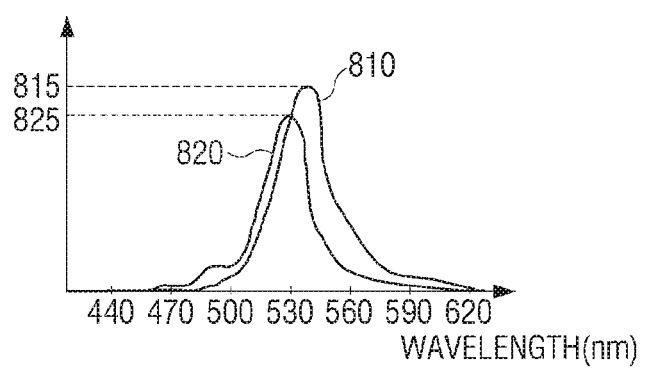
FIGS. 8A and 8B are graphs illustrating adjustment of a gradation value of an image considering brightness of a scotopic vision display.
Figure 8B:
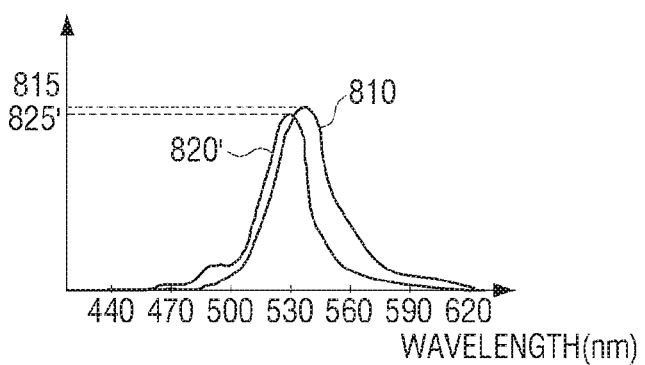

FIGS. 8A and 8B are, based on an assumption that the surrounding illuminance is less than or equal to a predetermined brightness in a constant manner, graphs illustrating an embodiment of adjusting the gradation value of an image by predicting the visual sensitivity characteristic according to brightness of an image displayed on a display (not shown) based on the brightness of an image displayed on a display (not shown), instead of the surrounding illuminance, being a criterion for determining photopic vision and scotopic vision.

In this example, the photopic vision and the scotopic vision may mean that the brightness of the image displayed on the display (not shown) may be greater than another predetermined brightness or less than another predetermined brightness. The surrounding illuminance may be 0 lux constantly, the brightness of the image displayed on the display (not shown) is equal to or less than 100 nit based on the 100 IRE, and the predetermined another brightness may be 40 nit.

The photopic vision may be set when the brightness of the image displayed on the display (not shown) is greater than or equal to 40 nit, and the scotopic vision may be set when the brightness of the image displayed on the display (not shown) is less than or equal to 40 nit. However, the embodiment is not limited to the above examples.

For example, in FIGS. 8A, 8B, and 8C, the photopic vision may be set when the brightness of the image displayed on the display (not shown) is greater than or equal to 40 nit, and the scotopic vision may be set when the brightness of the image displayed on the display (not shown) is 0 nit (when the display 130 is turned off), and the interval between 0 and 40 nit is set to mesopic vision.

FIG. 8A illustrates a "photopic vision green graph" 810 which is calculated by multiplying each of light intensity 320 of the output green wavelength of FIG. 3B by wavelengths (color) of an image by each the values on the photopic vision relative visual sensitivity curve 410 of FIG. 4A.

FIG. 8A illustrates a "scotopic vision green graph" 820, which is calculated by multiplying the intensity 320 of the output green wavelength of FIG. 3B for each wavelength (color) of an image by each value on the scotopic vision relative visual sensitivity curve 420 of FIG. 4A.

Referring to FIG. 8A, it can be seen that a maximum output value 815 of the "photopic vision green graph" 810 is greater than a maximum output value 825 of the "scotopic vision green graph" 820, through which it can be seen that, in the photopic vision, visual sensitivity for light of green wavelength is generally better than in the scotopic vision.

In this example, by increasing the output values of the "scotopic vision green graph" 820 so that the maximum output value 825 of the "scotopic vision green graph" 820 becomes similar to the maximum output value 815 of the "photopic vision green graph" 810, to make the maximum output value 825 of the "increased scotopic vision green graph" 820' be similar to the maximum output value 815 of the "photopic vision green graph" 810.

The processor 120 may adjust the gradation value of the image by using a method of increasing the scotopic vision green gain value as compared to the photopic vision by the predetermined ratio.

For R and B, based on the predetermined ratio that is acquired through the same process, the processor 120 may change the gain value of each R, G, and B based on a change in brightness of an image displayed on a display (not shown).

In this example, based on the R, G, and B gain values of the photopic vision (40 nit) and the scotopic vision (0 nit) being determined respectively, a linear graph may be acquired when the brightness of the image displayed on the display (not shown) for each gain value of R, G, and B is 0 nit to 40 nit, and when the brightness of the image is 0 nit to 40 nit consequently, R, G, and B gain values may be determined for each brightness.

The gradation value adjustment mechanism of an image according to an embodiment may be applied to adjustment of the gradation value of a light source (not shown) in a lighting device (not shown).

The lighting device may include a sensor (not shown) and a processor (not shown).

The sensor may be implemented with an illuminance sensor for measuring the surrounding brightness, that is, surrounding brightness, of the lighting device. The sensor may include a light variable resistor of which resistance value varies according to the measured light intensity.

The sensor may receive a photodiode which receives light energy around the lighting device and converts it to an electrical energy.

The processor may control an overall operation of the lighting device. The processor may adjust a gradation value of an image based on the surrounding illuminance value measured through the sensor.

The processor may acquire the surrounding illuminance of the lighting device through the sensor, confirm the gain value for adjusting an output gradation value of the light source based on the acquired surrounding illuminance, and adjust an output gradation value of the light source based on the confirmed gain value. The gain value may be determined based on a visual sensitivity characteristic of a user.

The lighting device including the light source, sensor, and processor may provide a lighting environment in which a user may feel constant color sensor even if the surrounding illuminance of the user and the lighting device changes.

Figure 9:
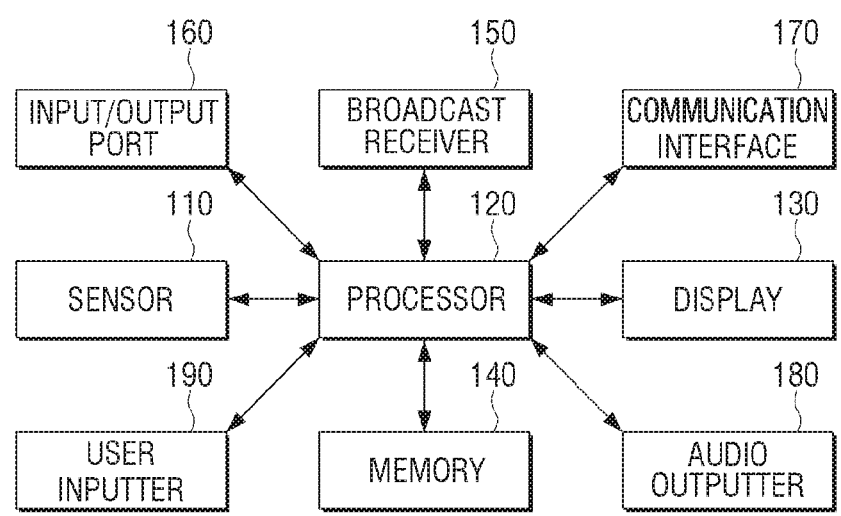
FIG. 9 is a block diagram schematically illustrating a configuration of an electronic device according to various embodiments.

FIG. 9 is a block diagram schematically illustrating a configuration of the electronic device 100 according to various embodiments.

Referring to FIG. 9, the electronic device 100 may further include at least one of a display 130, a memory 140, a receiver 150, an inputter 160, a communication interface 170, an audio outputter 180, in addition to the sensor 110 and the processor 120.

The display 130 is configured to visually display an image. The display 130 may be implemented as a liquid crystal display (LCD), light emitting diodes (LED), organic light emitting diodes (OLED), transparent OLED (TOLED), or the like.

The display 130 may display an image stored in the memory 140, an image input through the input/output port 160, an image received through the communication interface 170, or the like. The display 130 may display an image based on the control of the processor 120.

For example, the display 130 may display an image in which the gradation value is adjusted based on the control of the processor 120.

The display 130 may display a user interface (UI) to allow a user 200 to select whether to adjust the gradation value of the image to correspond to the changed surrounding illuminance value and inform the change of the value of the surrounding illuminance received through the sensor 110 under the control of the processor 120.

If the electronic device 100 is implemented as a set-top box or a server that does not include the display 130, the electronic device 100 may transmit, to an external device (not shown), data for an image in which the gradation value is adjusted. As a result of receiving, from the electronic device 100, the data for the image of which the gradation value is adjusted, the external device (not shown) may display an image of which the gradation value is adjusted.

The external device (not shown) may be implemented as a television (TV), a monitor, a smartphone, or the like, including a display capable of adjusting an image of which the gradation value is adjusted.

In this example, the electronic device 100 may transmit, to an external device (not shown), a signal to display a UI for selecting whether to adjust a gradation value of an image, and an external device (not shown) may display a UI corresponding to the received signal. Through the displayed UI, the user 200 may select whether to adjust the gradation value of the image to correspond to the changed surrounding illuminance value, while recognizing a change in the surrounding illuminance value.

The memory 140 is configured to store a command or data related to the elements of the electronic device 100 and the operating system (OS) for controlling overall operations of the elements of the electronic device 100. The memory 140 may be implemented as a non-volatile memory (e.g., a hard disc, a solid state drive (SSD), or a flash memory), a volatile memory, or the like.

The memory 140 may store the gradation values or gain values of each R, G, and B corresponding to the surrounding illuminance values of the electronic device 100.

The processor 120 may confirm the surrounding illuminance through the sensor 110 and adjust the gain values of R, G, and B for an image by receiving the gradation value matching the confirmed surrounding illuminance from the memory 140.

The broadcast receiver 150 may receive a signal on the broadcast contents. The broadcast contents may include an image, an audio, and additional data (for example, electronic program guides (EPG)), and the broadcast receiver 150 may receive a broadcast contents signal from various sources such as terrestrial broadcasting, cable broadcasting, satellite broadcasting, Internet broadcasting, or the like.

For example, the broadcast receiver 150 may be implemented to include configurations such as tuner (not shown), a demodulator (not shown), and an equalizer (not shown) for receiving broadcast contents transmitted from a broadcasting company.

Through the input/output port 160, the electronic device 100 may receive a signal for an image and/or voice from the outside or transmit an image and/or audio signal to the outside.

For this purpose, the input/output port 160 may be implemented as a wired port such as a high-definition multimedia interface (HDMI) port, a display port, a red, green, blue (RGB) port, a digital visual interface (DVI) port, Thunderbolt port, component port, and the like. Alternatively, the input/output port 160 may be implemented as a port for wireless communication such as Wi-Fi and Bluetooth communication, or the like.

The electronic device 100 may receive data for image and/or voice from an external device (not shown) through the input/output port 170 and output the image and/or voice through the display 130 or the audio outputter 180.

The electronic device 100 may transmit data for a particular voice or image to an external device (not shown) via the input/output port 170 so that the particular voice and/or image may be output via a voice outputter (not shown) and/or a display (not shown) of the external device.

In one example, as a result of inputting the image of which the gradation value is adjusted by the electronic device 100 to an external device (not shown) which is a TV through the input/output port 170, the image of which the gradation value is adjusted may be displayed on a display (not shown) of the external device.

The communication interface 170 is configured to communicate with various types of external devices according to various types of communication methods. The communication interface 170 may include a Wi-Fi chip (not shown) and a Bluetooth chip (not shown).

The processor 120 may communicate with various external devices using the communication interface 170. The communication interface 170 may perform data communication with an external device (not shown) by wire or wirelessly.

When performing data communication with an external device in a wireless communication method, the communication interface 170 may include at least one of a WiFi direct communication module, a Bluetooth module, an infrared data association (IrDA) module, a near field communication (NFC) module, a Zigbee module, a cellular communication module, a 3rd generation (3G) mobile communication module, a fourth generation (4G) mobile communication module, a fourth Long Term Evolution (LTE) communication module.

As an example, the electronic device 100, which is a TV, a PC, or a smartphone, may transmit a surrounding illuminance measurement result of the sensor 110 to an external device (not shown) that is a server via the communication interface 170. In this example, if the external device calculates or confirms the gain value of the image corresponding to the measured surrounding illuminance value and transmits the gain value to the electronic device 100, the electronic device 100 may adjust the gradation value of the image based on the gain value of the image received through the communication interface 170.

As another example, when the electronic device 100 transmits the surrounding illuminance measurement result of the sensor 110 to an external device (not shown) which is a server through the communication interface 170, the external device may calculate or confirm the gain value of the image corresponding to the measured surrounding illuminance value and then adjust the gradation value of an image based on the gain value of the calculated or confirmed image.

In this example, the electronic device 100 receiving the adjusted gradation value from the external device through the communication interface 170 may display an image having an adjusted gradation value through the display 130. Alternatively, the electronic device 100 may transmit data for an image having an adjusted gradation value to another external device (not shown) that includes a display to cause another external device (not shown) to display an image having an adjusted gradation value.

In this example, another external device (not shown) may be a TV connected to the electronic device 100, which is a set-top box, or a monitor connected to the electronic device 100, which is a PC. The electronic device 100 may transmit to another external device (not shown) data for an image having an adjusted gradation value via the input/output port 160 or the communication interface 170.

When performing data communication with an external device vis wired communication method, the communication interface 170 may include an interface module such as a universal serial bus (USB), and may be physically connected to an external terminal device such as a PC through the interface module, and transceive voice or image data or transceive firmware data for performing firmware upgrade.

The audio outputter 180 is configured to output audio corresponding to a voice recognition result under the control of the processor 120 or an event according to a voice recognition result. For example, the audio outputter 180 may output audio included in a broadcast signal received through a tuner (not shown), or audio input through the communication interface 170 or a microphone (not shown), or audio included in an audio file stored in the memory 140.

The audio outputter 180 may include a speaker (not shown) and a headphone/earphone output terminal (not shown).

The audio outputter 180 may output a voice to inform the user 200 of a change in the surrounding illuminance measured by the sensor 110.

The audio outputter 180 may output a voice for informing the user 200 that a gradation value of an image displayed on a display (not shown) of the display 130 or an external device has been changed or is being changed under the control of the processor 120.

The user inputter 190 may receive various user commands. The processor 120 may execute a function corresponding to a user command input by the user inputter 190.

For example, the user inputter 190 may receive a user command for changing a channel, adjusting a volume, or the like, and the processor 120 may change a channel for receiving a broadcast through the broadcast receiver 150 or adjust a volume of the voice output through the audio outputter 180 according to the input user command.

The user inputter 160 may include a microphone (not shown) to receive the user 200 command in a voice form, or may be implemented with the display 130 as a touch screen or may be implemented as a separate touchpad (not shown) to receive the user 200 command as a touch of the user.

The user inputter 160 may receive a user command signal from a remote control device (not shown) to control the electronic device 100.

For example, the user inputter 160 may receive a user command to adjust the gradation value of an image in response to the surrounding illuminance value measured by the sensor 110.

Figure 10:
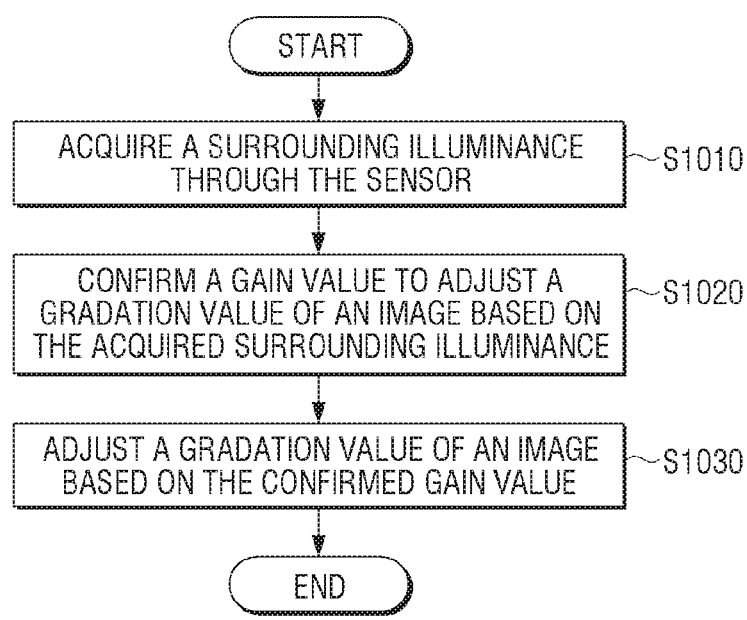
FIG. 10 is a flowchart illustrating a method for controlling color temperature according to an embodiment.

FIG. 10 is a flowchart illustrating a method for controlling the electronic device 100 according to an embodiment.

A surrounding illuminance of the electronic device 100 may be acquired through the sensor in operation S1010.

A gain value to adjust a gradation value of an image may be confirmed based on the acquired surrounding illuminance in operation S1020. The gain value may be determined based on a visual sensitivity characteristic of a user.

The gain value may be based on whether the acquired surrounding illuminance is darker than a predetermined brightness, whether the acquired surrounding illuminance is changed to be different from the past, or the like.

The gradation value of an image displayed on the display 130 may be adjusted based on the gain value in operation S1030.

The controlling method may, when the surrounding illuminance is darker than a predetermined brightness, adjust the gradation value of the image based on the gain value determined according to the surrounding illuminance and the visual sensitivity characteristic of the user.

This is based on the visual sensitivity characteristic that the darker the surrounding illuminance is, the visual sensitivity gets better in a comparatively low wavelength.

In this example, if the surrounding illuminance is darker than the predetermined brightness, the gradation value of B having high visual sensitivity may be decreased and the gradation value of R having high visual sensitivity may be increased, in the scotopic vision among R, G, and B, based on the gain value.

In this example, the gain value may include an R gain value for adjusting the gradation value of R and a B gain value for adjusting the gradation value of B, and the R gain value for adjusting the gradation value of R may gradually increase with respect to a reference value corresponding to the preset brightness when the surrounding illuminance is darker, and the B gain value for adjusting the gradation value of B may be gradually decreased as the surrounding illuminance becomes darker based on a reference value corresponding to the predetermined brightness.

The degree to which the R gain value and the B gain value change according to the surrounding illuminance may be determined based on a target change amount for the color temperature of an image.

The controlling method may include, when the surrounding illuminance gets darker than the predetermined brightness, adjusting the gradation value of the image based on the determined gain value.

For example, in a state where the surrounding illuminance of the electronic device 100 is brighter than a predetermined brightness, when the surrounding illuminance of the electronic device 100 gets dark, the controlling method may adjust the gradation value of the image in response to the change of the surrounding illuminance The controlling method may include confirming a target gradation value for an image based on the gain value and adjusting the gradation value of the image by changing the gradation value of the image to the target gradation value.

The controlling method may include adjusting the gradation value of the image so that the gradation value of the image is the target gradation value within the first time when the surrounding illuminance is darker than the predetermined brightness, and adjusting the gradation value of the image such that the gradation value of the image is the target gradation value within a second time shorter than the first time when the surrounding illuminance is brighter than the predetermined brightness.

This is because, when the surrounding illuminance shifts from the photopic vision to the scotopic vision, or from the scotopic vision to the photopic vision, a certain amount of time is required for the human eye to adapt to darkness or adapt to brightness.

In general, it is known that the time for the human eye to adapt to darkness is about 45 minutes, and the time to adapt to brightness is about one minute.

The controlling method of FIG. 10 may be performed by the electronic device 100 illustrated and described in FIG. 2 or FIG. 9 solely or together with the electronic device 100 and one or more external device (not shown).

The controlling method of FIG. 10 may be implemented with software and stored in the memory 140 of the electronic device 100 and may be performed through the sensor 110, the processor 120, or the like.

According to various embodiments, even if the surrounding illuminance changes, the color sense of the image displayed on the display does not significantly change and thus, the watching environment of the user may be significantly improved.

The various embodiments described above may be implemented in a recordable medium which is readable by computer or a device similar to computer using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electric units for performing other functions.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic device 100 according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic device comprising:
a sensor; and
a processor configured to:
obtain a surrounding illuminance of the electronic device through the sensor,
identify a gain value for adjusting a gradation value of an image based on a first condition related to the surrounding illuminance and a second condition related to brightness of the image, and
based on the surrounding illuminance being darker than a first brightness and the brightness of the image being darker than a second brightness, adjust the gradation value of the image based on the identified gain value,
wherein the gain value is identified based on a user visual sensitivity characteristic.

2. The electronic device of claim 1, wherein the processor is further configured to:
based on the surrounding illuminance being darker than the first brightness and the brightness of the image being darker than the second brightness, among red (R), green (G), and blue (B), decrease a gradation value of B, having a higher user visual sensitivity than the G and R -in a scotopic vision, or increase a gradation value of R, having a lower user visual sensitivity than G and B in a scotopic vision, based on the identified gain value.

3. The electronic device of claim 2, wherein:
the identified gain value comprises an R gain value for adjusting a gradation value of R and a B gain value for adjusting a gradation value of B,
the R gain value is higher for darker surrounding illuminances, with respect to a first reference value corresponding to the first brightness, and
the B gain value is lower for darker surrounding illuminances, with respect to a second reference value corresponding to the first brightness.

4. The electronic device of claim 3, wherein the R gain value and the B gain value are adjusted based on a target change amount with respect to a color temperature of the image.

5. The electronic device of claim 1, wherein the processor is further configured to, based on the surrounding illuminance becoming darker than the first brightness in a state in which the surrounding illuminance is brighter than the first brightness and the brightness of the image is darker than the second brightness, adjust the gradation value of the image based on the identified gain value.

6. The electronic device of claim 1, wherein the processor is further configured to identify a target gradation value for the image based on the identified gain value, and adjust the gradation value of the image by changing the gradation value of the image to the target gradation value.

7. The electronic device of claim 6, wherein the processor is further configured to:
based on the surrounding illuminance being darker than the first brightness, adjust the gradation value so that the gradation value becomes the target gradation value within a first time.

8. A method for controlling an electronic device, the method comprising:
obtaining a surrounding illuminance of the electronic device through a sensor;
identifying a gain value for adjusting a gradation value of an image based on a first condition related to the surrounding illuminance and a second condition related to brightness of the image; and
based on the surrounding illuminance being darker than a first brightness and the brightness of the image being darker than a second brightness, adjusting the gradation value of the image based on the identified gain value,
wherein the gain value is a value identified based on a user visual sensitivity characteristic.

9. The method of claim 8, wherein the adjusting comprises, based on the surrounding illuminance being darker than the first brightness and the brightness of the image being darker than the second brightness, among red (R), green (G), and blue (B), decreasing a gradation value of B, having a higher user visual sensitivity than the G and R in a scotopic vision, or increasing a gradation value of R, having a lower user visual sensitivity than G and B in a scotopic vision, based on the identified gain value.

10. The method of claim 9, wherein:
the identified gain value comprises an R gain value for adjusting a gradation value of R and a B gain value for adjusting a gradation value of B,
the R gain value is higher for darker surrounding illuminances, with respect to a first reference value corresponding to the first brightness, and the B gain value is lower for darker surrounding illuminances, with respect to a second reference value corresponding to the first brightness.

11. The method of claim 10, wherein the R gain value and the B gain value are adjusted based on a target change amount with respect to a color temperature of the image.

12. The method of claim 8, wherein, based on the surrounding illuminance becoming darker than the first brightness in a state in which the surrounding illuminance is brighter than the first brightness and the brightness of the image is darker than a second brightness, adjusting the gradation value of the image based on the identified gain value.

13. The method of claim 8, wherein the adjusting comprises identifying a target gradation value for the image based on the identified gain value, and adjusting the gradation value of the image by changing the gradation value of the image to the target gradation value.

* * * * *